United States Patent
Yavo et al.

(10) Patent No.: US 11,244,051 B2
(45) Date of Patent: Feb. 8, 2022

(54) SYSTEM AND METHODS FOR DETECTION OF CRYPTOWARE

(71) Applicant: Fortinet, Inc., Sunnyvale, CA (US)

(72) Inventors: Udi Yavo, Herzliya (IL); Tomer Bitton, Herzliya (IL); Ido Kelson, Herzliya (IL); Gregory Messerman, Herzlia (IL)

(73) Assignee: Fortinet, Inc., Sunnyvale, CA (US)

( * ) Notice: Subject to any disclaimer, the term of this patent is extended or adjusted under 35 U.S.C. 154(b) by 223 days.

(21) Appl. No.: 16/468,290

(22) PCT Filed: Dec. 11, 2017

(86) PCT No.: PCT/IB2017/057785
§ 371 (c)(1),
(2) Date: Jun. 11, 2019

(87) PCT Pub. No.: WO2018/104925
PCT Pub. Date: Jun. 14, 2018

(65) Prior Publication Data
US 2019/0347415 A1    Nov. 14, 2019

Related U.S. Application Data (60) Provisional application No. 62/432,596, filed on Dec. 11, 2016.

(51) Int. Cl.
*G06F 21/53* (2013.01)
*G06F 21/00* (2013.01)
*G06F 21/56* (2013.01)

(52) U.S. Cl.
CPC ............ *G06F 21/566* (2013.01); *G06F 21/53* (2013.01); *G06F 21/561* (2013.01); *G06F 2221/033* (2013.01)

(58) Field of Classification Search
CPC ...... G06F 21/566; G06F 21/53; G06F 21/561; G06F 2221/033; G06F 21/554
See application file for complete search history.

(56) References Cited

U.S. PATENT DOCUMENTS 6,526,488 B1  2/2003  White et al.
8,352,522 B1  1/2013  Cheng
(Continued)

FOREIGN PATENT DOCUMENTS

CN   102902924   1/2013
EP     1661290   1/2008
(Continued)

OTHER PUBLICATIONS

European Search Report and Written Opinion for Application No. EP 17879361.8, dated Jan. 7, 2020, 5 pages.
(Continued)

*Primary Examiner* — Alexander Lagor
(74) *Attorney, Agent, or Firm* — HDC Intellectual Property Law, LLP (57) ABSTRACT

A computer implemented method for protecting data stored in at least one file from being overwritten by malicious code, comprises: monitoring at least one file stored in a storage device location to detect a request to perform an overwrite operation at least a portion of data of the at least one file; redirecting the overwrite operation to a memory location designated as safe for being overwritten; analyzing the overwrite operation at the memory location to identify an association with malicious code; and outputting an indication of an attempt to overwrite the at least one file by malicious code.

22 Claims, 2 Drawing Sheets

(56) References Cited

U.S. PATENT DOCUMENTS

| | | | |
|---|---|---|---|
| 2015/0058987 A1 | 2/2015 | Thure et al. | |
| 2015/0235025 A1 | 8/2015 | Mundy | |
| 2016/0224788 A1* | 8/2016 | Coronado | G06F 21/566 |
| 2016/0378988 A1* | 12/2016 | Bhashkar | G06F 21/568 |
| | | | 726/24 |
| 2017/0364681 A1* | 12/2017 | Roguine | G06F 21/568 |
| 2018/0075239 A1* | 3/2018 | Boutnaru | G06F 21/60 |

FOREIGN PATENT DOCUMENTS

| | | |
|---|---|---|
| GB | 2517483 A | 2/2015 |
| JP | 5472604 | 4/2011 |
| JP | 2011081652 | 4/2011 |
| WO | WO 2005/027402 | 3/2005 |
| WO | WO 2018/104925 | 6/2018 |

OTHER PUBLICATIONS

International Preliminary Report on Patentability dated Jun. 20, 2019 From the International Bureau of WIPO Re. Application No. PCT/IB2017/057785. (6 Pages).

International Search Report and the Written Opinion dated Mar. 29, 2018 From the International Searching Authority Re. Application No. PCT/IB2017/057785. (10 Pages).

* cited by examiner

SYSTEM AND METHODS FOR DETECTION OF CRYPTOWARE

RELATED APPLICATIONS

This application is a National Phase of PCT Patent Application No. PCT/IB2017/057785 having International filing date of Dec. 11, 2017, which claims the benefit of priority under 35 USC § 119(e) of U.S. Provisional Patent Application No. 62/432,596 filed on Dec. 11, 2016. The contents of the above applications are all incorporated by reference as if fully set forth herein in their entirety.

FIELD AND BACKGROUND OF THE INVENTION

The present invention, in some embodiments thereof, relates to malicious code detection and, more specifically, but not exclusively, to systems and methods for detection and/or prevention of cryptoware.

Some types of malicious code, for example cryptoware, modify stored data to make the data inaccessible to a user. Cryptoware malware encrypts stored files, for example, files which may contain important information such as financial records, and/or files related to the file system that control functions of a computer. Ransom is demanded from the user in exchange for decryption of the files. Cryptoware may encrypt stored files with a strong cryptographic algorithm, making it effectively impossible for the user to recover the data without paying the ransom to obtain the cryptographic key.

Another example of malicious code destroys stored data (i.e., instead of encrypting the data). For example, the malicious code writes the value zero (0) over the contents of the stored file.

SUMMARY OF THE INVENTION

According to a first aspect, a computer implemented method for protecting data stored in at least one file from being overwritten by malicious code, comprises: monitoring at least one file stored in a storage device location to detect a request to perform an overwrite operation at least a portion of data of the at least one file; redirecting the overwrite operation to a memory location designated as safe for being overwritten; analyzing the overwrite operation at the memory location to identify an association with malicious code; and outputting an indication of an attempt to overwrite the at least one file by malicious code.

According to a second aspect, a system for protecting data stored in at least one file from being overwritten by malicious code, comprises: a program store storing code; and a processor coupled to the program store for implementing the stored code, the code comprising: code to monitor at least one file stored in a storage device location to detect a request to perform an overwrite operation at least a portion of data of the at least one file, redirect the overwrite operation to a memory location designated as safe for being overwritten, analyze the overwrite operation at the memory location to identify an association with malicious code; and output an indication of an attempt to overwrite the at least one file by malicious code.

The redirection of the overwrite operation to the safe memory location preserves the integrity of the target file, for example, rather than analyzing the effects of the overwrite operation on the target file and attempting to recover or reverse the overwrite operation effects. The redirection of the overwrite operation to the safe memory location provides a safe location for analysis of the effects of the overwrite operation without compromising the original target file. It is noted that the file is preserved even when the validation does not occur, for example due to a power outage.

The systems and/or methods described herein relate to redirecting an overwrite operation targeting a file stored in a storage device (optionally persistent storage) location to another memory location designated as safe. The systems and/or methods isolate the effects of the overwrite operation from the target file, by redirecting the overwrite operation to the safe memory location. A mirror file that mirrors the target file may be created in the physical safe memory location. The mirror file may be overwritten by the redirected overwrite operation. The overwritten mirror file is analyzed to determine whether the overwrite operation is associated with malicious code. New data may be created in the form of the mirror file, which is used to preserve the integrity of the target file by protecting the target file from an overwrite operation by malicious code.

The systems and/or methods described herein improve performance of a computer (e.g., improvement in processor and/or memory utilization) such as a client terminal and/or server, by protecting files from being overwritten, for example, important data files, and/or files responsible for performing computer functions (e.g., kernel files, low-level function drivers, operating system files). Overwriting the file(s) may damage the computer, for example, preventing the operating system from performing certain tasks, rendering the computer unusable, and/or requiring significant effort to restore the overwritten files. The overwriting may utilize existing available processing and/or memory resources.

In a first possible implementation form of the method or the system according to the first or second aspects, the method further comprises and/or the system further includes code comprising: creating a mirror of the at least one file at the memory location, and redirecting the overwrite operation to the mirror of the at least one file.

In a second possible implementation form of the method or the system according to the first implementation forms of the first or second aspects, analyzing the overwrite operation comprises verifying the file structure of the mirror of the at least one file according to a predefined file structure.

In a third possible implementation form of the method or the system according to the first or second implementation forms of the first or second aspects, analyzing the overwrite operation comprises identifying an encryption of the mirror of the at least one file by parsing the mirror to identify at least one field, calculating a difference between a calculated entropy of each identified at least one field of the mirror and a calculated entropy of a corresponding at least one field of the file at the storage device location, and evaluating the calculated difference according to a requirement representing an allowed tolerance error between the calculated entropy values.

In a fourth possible implementation form of the method or the system according to the first, second, or third implementation forms of the first or second aspects, analyzing the overwrite operation comprises identifying an encryption of the mirror of the at least one file by parsing the mirror to identify at least one field, determining at least one illegal value in the at least one field by comparing at least one value of each identified at least one field of the mirror to a corresponding at least one value of at least one field of the file at the storage device location, and evaluating the compared difference according to a requirement representing predefined allowed values.

In a fifth possible implementation form of the method or the system according to the first, second, third, or fourth implementation forms of the first or second aspects, analyzing the overwrite operation comprises identifying non-text data at least at one location of the mirror of the at least one file designated to include text data at the corresponding at least one location of the at least one file at the storage device location.

In a sixth possible implementation form of the method or the system according to the first, second, third, fourth, or fifth implementation forms of the first or second aspects, the mirror of the at least one file stores only the portions of at least one file that are designated to be overwritten by the overwrite operation, wherein the mirror of the at least one file does not include portions of the at least one file that are unaffected by the overwrite operation.

In a seventh possible implementation form of the method or the system according to the first, second, third, fourth, fifth, or sixth implementation forms of the first or second aspects, the creating the mirror file is performed iteratively for successive portions of the at least one file, wherein each successive portion is copied to the location of the mirror file triggered by a write operation to the respective portion, wherein the analyzing is performed iteratively for each successive portion.

In an eighth possible implementation form of the method or the system according to the seventh implementation forms of the first or second aspects, each successive portion is copied to the location of the mirror file up to a predefined size threshold.

In a ninth possible implementation form of the method or the system according to the first or second aspects as such or according to any of the preceding implementation forms of the first or second aspects, analyzing the overwrite operation comprises checking whether the portion of data of the at least one file is read prior to the request to perform the overwrite operation of the portion of the at least one file.

In a tenth possible implementation form of the method or the system according to the first or second aspects as such or according to any of the preceding implementation forms of the first or second aspects the association with malicious code is identified when the overwrite operation is detected as being performed on a plurality of files including at least a predefined number of files.

In an eleventh possible implementation form of the method or the system according to the first or second aspects as such or according to any of the preceding implementation forms of the first or second aspects the association with malicious code is identified when a deletion operation of the portion of the at least one file is attempted after the overwrite operation of the portion of the at least one file.

In a twelfth possible implementation form of the method or the system according to the first or second aspects as such or according to any of the preceding implementation forms of the first or second aspects the overwrite operation comprises at least one of: encrypting at least the portion of the at least one file, renaming the at least one file, changing content of at least the portion of the at least one file to irrelevant values, and deleting at least the portion of the at least one file.

In a thirteenth possible implementation form of the method or the system according to the first or second aspects as such or according to any of the preceding implementation forms of the first or second aspects, the method and/or system, further comprise determining whether the at least one file is designated for protection.

In a fourteenth possible implementation form of the method or the system according to the first or second aspects as such or according to any of the preceding implementation forms of the first or second aspects, determining comprises analyzing a format of the at least one file according to a predefined file format designated for protection.

In a fifteenth possible implementation form of the method or the system according to the fourteenth implementation forms of the first or second aspects, the predefined file format is a member selected from the group consisting of: a word processing document file format, a spreadsheet file format, a PDF file format, and a presentation file format.

In a sixteenth possible implementation form of the method or the system according to the first or second aspects as such or according to any of the preceding implementation forms of the first or second aspects, the method and/or system further comprise: analyzing the overwrite operation to identify an overwrite to a header of the at least one file; and triggering the redirecting the overwrite operation when the overwrite to the header is identified.

In a seventeenth possible implementation form of the method or the system according to the first or second aspects as such or according to any of the preceding implementation forms of the first or second aspects, the method and/or system further comprise analyzing the overwrite operation at the memory location to identify an association with safe code; and overwriting the at least one file at the storage device location with the overwritten data at the memory location.

In an eighteenth possible implementation form of the method or the system according to the seventeenth implementation forms of the first or second aspects, analyzing comprises identifying an association with the safe code based on an intact file header at the memory location.

In a nineteenth possible implementation form of the method or the system according to the first or second aspects as such or according to any of the preceding implementation forms of the first or second aspects, the at least one file at the storage device location remains intact during the overwrite operation at the memory location.

In a twentieth possible implementation form of the method or the system according to the first or second aspects as such or according to any of the preceding implementation forms of the first or second aspects, the method and/or system further comprise deleting the overwritten data at the memory location when the analysis identifies identify the overwrite operation associated with malicious code.

In a twenty-first possible implementation form of the method or the system according to the first or second aspects as such or according to any of the preceding implementation forms of the first or second aspects, analyzing the overwrite operation is performed according to at least one of: when the overwrite operation is complete, and when a predefined size of data is overwritten.

In a twenty-second possible implementation form of the method or the system according to the first or second aspects as such or according to any of the preceding implementation forms of the first or second aspects, analyzing the overwrite operation comprises detecting encryption by calculating entropy of the data overwritten at the memory location according to an entropy requirement representing encrypted data.

In a twenty-second possible implementation form of the method or the system according to the first or second aspects as such or according to any of the preceding implementation forms of the first or second aspects, the redirecting is performed when the overwrite operation is associated with an application without a visible window presented on a display.

In a twenty-third possible implementation form of the method or the system according to the first or second aspects as such or according to any of the preceding implementation forms of the first or second aspects, the method and/or system further comprise presenting a user interface on a display in response to detecting the overwrite operation to allow a user to confirm the overwrite operation as associated with safe code.

In a twenty-fourth possible implementation form of the method or the system according to the twenty-third implementation forms of the first or second aspects, further comprising adding an application associated with the overwrite operation to a whitelist of safe applications exhibiting cryptoware-like behavior when the user confirms the overwrite operation as safe.

In a twenty-fifth possible implementation form of the method or the system according to the first or second aspects as such or according to any of the preceding implementation forms of the first or second aspects, the method and/or system further comprise performing the redirecting when an application associated with the overwrite operation is not identified within a whitelist of safe applications exhibiting cryptoware-like behavior.

In a twenty-sixth possible implementation form of the method or the system according to the first or second aspects as such or according to any of the preceding implementation forms of the first or second aspects, the method and/or system further comprise performing the analyzing in response to opening of the at least one file with write permission and/or file overwrite, wherein the analyzing the open/overwrite operation is performed by an analysis of at least one of stack trace and flow-data to determine whether access to the at least one file is permitted or whether access to the at least one file is denied.

In a twenty-seventh possible implementation form of the method according to the first aspect as such or according to any of the preceding forms of the first aspect, a computer program stored on a computer readable medium runs the method when executed by one or more processors of one or more computers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to malicious code detection and, more specifically, but not exclusively, to systems and methods for detection and/or prevention of cryptoware.

An aspect of some embodiments of the present invention relate to systems and/or methods (e.g., code instructions executed by a processor) that prevent one or more files (or portion(s) thereof) stored on a storage device (optionally persistent storage, for example, a hard drive) from being overwritten by malicious code (e.g., encrypted and/or deleted and/or overwritten with irrelevant data that cannot be used to recover the original data) by redirecting the overwrite operation from the target file to a memory location designated as safe for being overwritten. As used herein, the data at the memory location designated as safe for being overwritten to which the overwrite operation is directed is referred to herein as a mirror file. The redirection of the overwrite operation to the mirror file prevents (or reduces) changes to the file(s) stored by the persistent storage before confirmation that the overwrite operation is an authorized operation and/or not associated with malicious code. The mirror file represents the actual state of the file when the overwrite operations is executed. The overwritten data at the safe memory location is analyzed to determine whether the overwritten data is associated with malicious code. The redirection of the overwrite operation to the safe memory location preserves the integrity of the target file, for example, rather than analyzing the effects of the overwrite operation on the target file and attempting to recover or reverse the overwrite operation effects. The redirection of the overwrite operation to the safe memory location provides a safe location for analysis of the effects of the overwrite operation without compromising the original target file. It is noted that the file is preserved even when the validation does not occur, for example due to a power outage.

Optionally, the mirror of the target file is created at the safe memory location. The overwrite operation is redirected to the mirror target file at the safe memory location instead of the target file. The effects of the overwrite operation on the mirror file may be safely analyzed while the data of the target file is preserved. The effects of the overwrite operation on file structure, encryption of the file (or portion thereof), and/or on text data of the file may be analyzed based on the mirror file, to determine whether the overwrite operation is associated with malicious code or with safe code.

Optionally, when safe code is identified as associated with the overwrite operation based on an analysis of the overwrite at the safe memory, the overwritten data at the safe memory location (optionally the overwritten mirror file) is written to the target file at the original storage device location. Alternatively, when malicious code is identified as associated with the overwrite operation based on analysis of the overwrite operation at the safe location, the overwritten data at the safe location may be deleted (optionally permanently deleted) and/or an indication of the association with malicious code may be created (e.g., a pop-up message presented on a display of a client terminal). Alternatively or additionally, the modified data created by the overwrite operation may be stored in a different storage location (e.g., in a storage device). The stored modified data may be used to analyze the process issuing the overwrite operation and/or may be used to restore the file according to the modified data when the overwrite operation is identified as a false positive (e.g., incorrectly identified as malicious code, when in fact the process issuing the overwrite command is an authorized process).

The systems and/or methods described herein provide a technical solution to the technical problem of identification of malicious code executing on a memory of a computer that overwrites files stored in storage device (optionally persistent storage) of the computer by encrypting the contents of the file (e.g., cryptoware, ransomware) and/or deleting the file (e.g., by overwriting the file with irrelevant data that cannot be used to recover the original data).

The systems and/or methods described herein relate to redirecting an overwrite operation targeting a file stored in a storage device (optionally persistent storage) location to another memory location designated as safe. The systems and/or methods isolate the effects of the overwrite operation from the target file, by redirecting the overwrite operation to the safe memory location. A mirror file that mirrors the target file may be created in the physical safe memory location. The mirror file may be overwritten by the redirected overwrite operation. The overwritten mirror file is analyzed to determine whether the overwrite operation is associated with malicious code. New data may be created in the form of the mirror file, which is used to preserve the integrity of the target file by protecting the target file from an overwrite operation by malicious code.

The systems and/or methods described herein improve performance of a computer (e.g., improvement in processor and/or memory utilization) such as a client terminal and/or server, by protecting files from being overwritten, for example, important data files, and/or files responsible for performing computer functions (e.g., kernel files, low-level function drivers, operating system files). Overwriting the file(s) may damage the computer, for example, preventing the operating system from performing certain tasks, rendering the computer unusable, and/or requiring significant effort to restore the overwritten files. The overwriting may utilize existing available processing and/or memory resources.

Accordingly, the systems and/or methods described herein are inextricably tied to computer technology to overcome an actual technical problem arising in safe storage of files by a storage device, optionally persistent storage.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term file means data that may be stored according to a certain format, for example, a text file, a database file for use by a database program, a word file for use by a word processing document, a spreadsheet file for use by a spreadsheet program, a graphic file for use by a graphic program, a library file for use by a compiler, a customized file for use by a custom designed program, a set of data used by a user (i.e., following a user defined format), a document stored using a portable document format (PDF) for use by a PDF reader, a presentation file for use by a presentation program (e.g., slideshow), and a temporary file used by a running program.

As used herein, references to the file, for example, overwriting and/or encrypting the file may sometimes refer to portion(s) of the file, for example, overwriting and/or encrypting one or more portions of the file. The term the file may refer to the entire file, and/or one or more portions of the file.

As used herein, the term overwritten (by the malicious code) may sometimes be interchanges with other mechanisms that destroy the original data and/or make it impossible or difficult to recover the original data, for example, encrypted and/or deleted.

Figure 1:
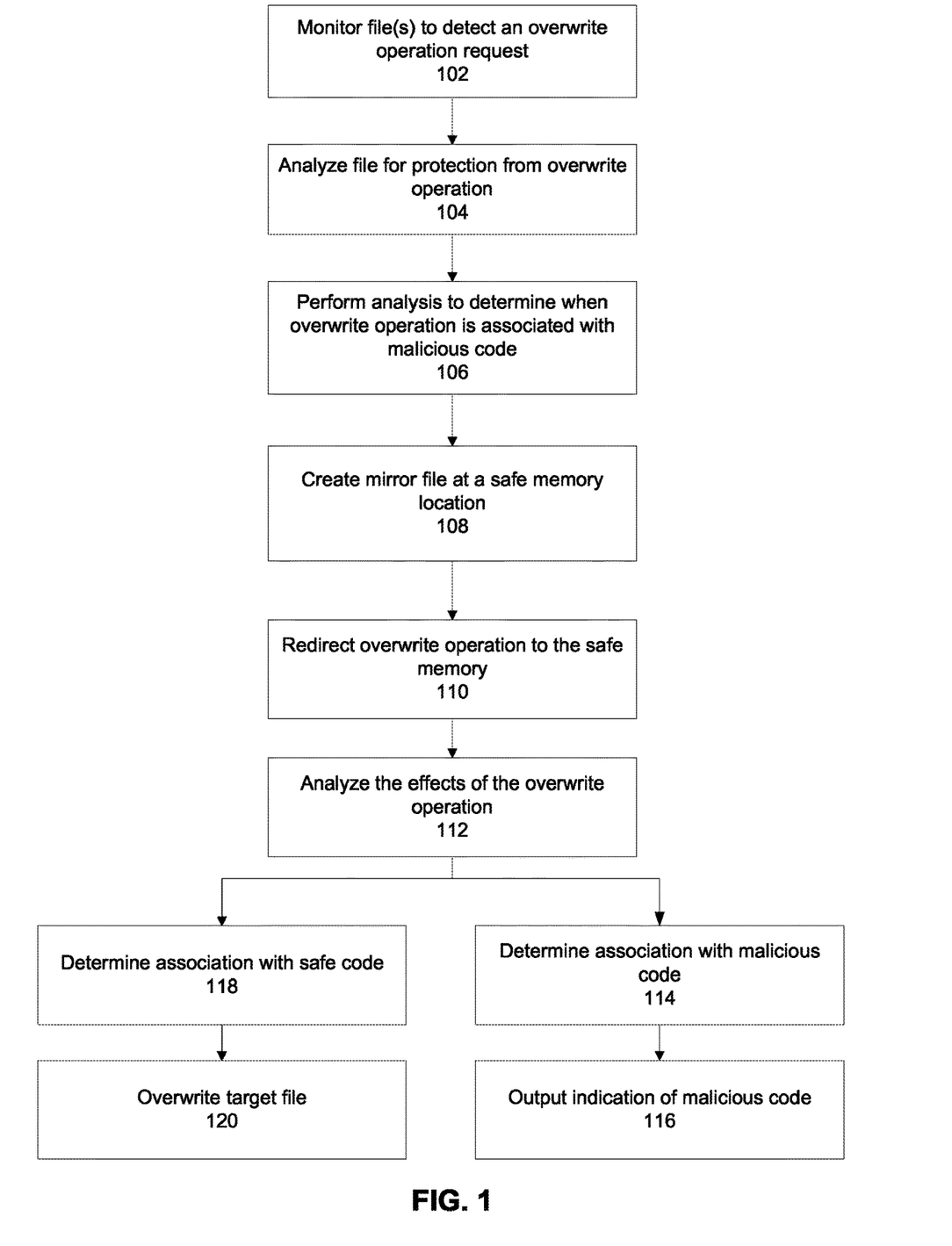
FIG. 1 is a flowchart of a method for protecting file(s) stored in a storage device from being overwritten by malicious code, in accordance with some embodiments of the present invention.
Figure 2:
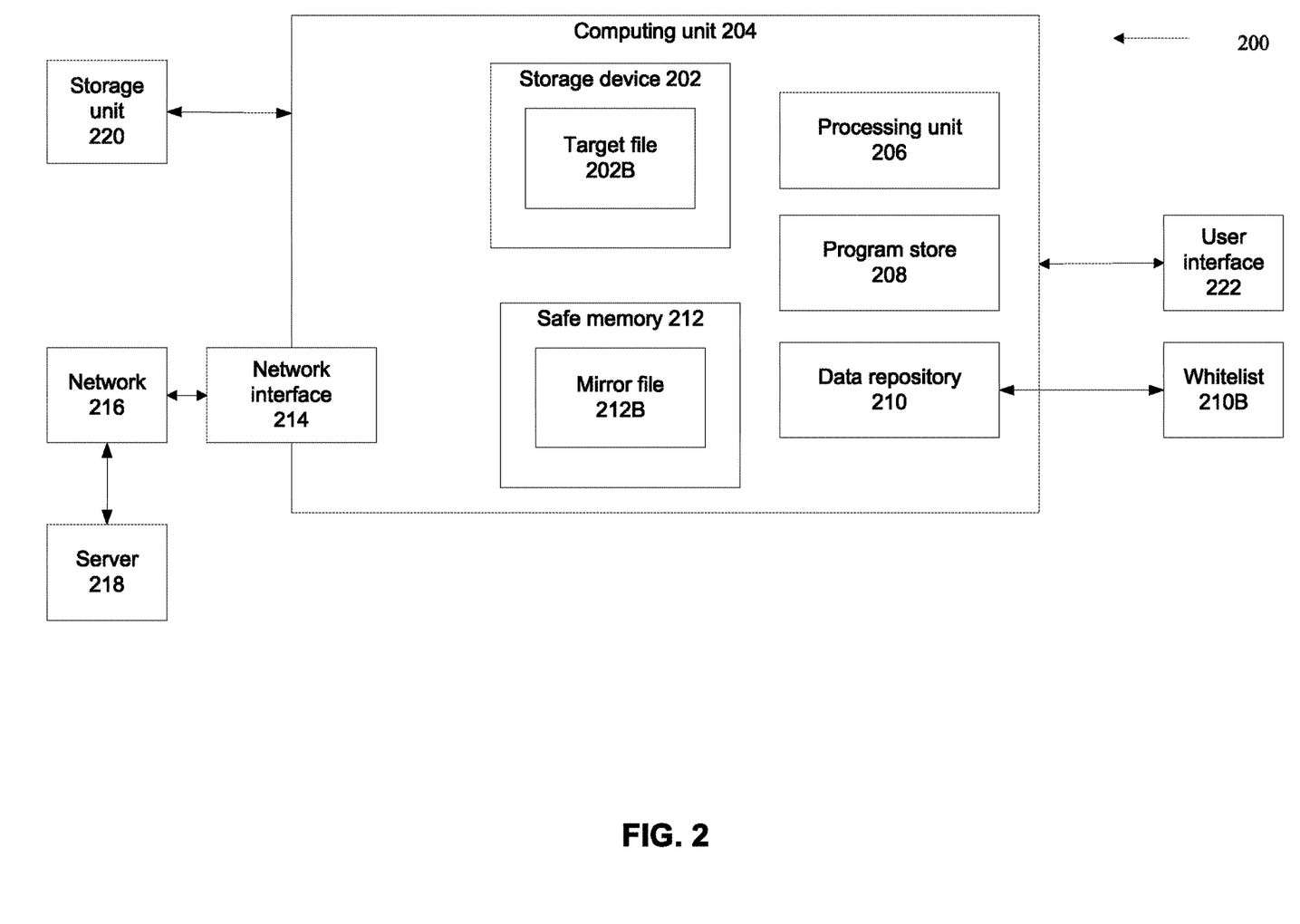
FIG. 2 is a block diagram of a system that protects file(s) stored in a storage device of a computing unit from being overwritten by malicious code, in accordance with some embodiments of the present invention.

Reference is now made to FIG. 1, which is a flowchart of a method for protecting file(s) stored in a storage device from being overwritten by malicious code, in accordance with some embodiments of the present invention. The method redirects the overwrite operation, issued by code that may be malicious, to a safe memory location. The effect of the overwrite operation is analyzed to determine whether the overwrite operation is associated with malicious code. Reference is also made to FIG. 2, which is a block diagram of a system 200 that protects file(s) stored in a storage device 202 of a computing unit 204 from being overwritten by malicious code, in accordance with some embodiments of the present invention. System 200 may execute the acts of the method described with reference to FIG. 1, for example, by processing unit 206 executing code instructions stored in a program store 208.

System 200 and/or the method described with reference to FIG. 1 (i.e., when code instructions based on the method are executed by one or more processors) protect file(s) from being destroyed by malicious code, for example, cryptoware, ransomware, viruses, worms, Trojan horses, spyware, and adware. The malicious code may be installed as executable code, a script, an application, and other software.

Computing unit 204 may be implemented as, for example, a client terminal, a server, a mobile device, a desktop computer, a thin client, a Smartphone, a Tablet computer, a laptop computer, a wearable computer, glasses computer, and a watch computer.

Processing unit 206 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 206 may include one or more processors (homogenous or heterogeneous), which may be arranged for parallel processing, as clusters and/or as one or more multi core processing units.

Program store 208 stores code instructions implementable by processing unit 206, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing unit 204 may include a data repository 210 for storing data, for example, a whitelist 210B of safe applications that display cryptoware-like behavior. Data repository 210 may be implemented as, for example, a memory, a local hard-drive, a removable storage unit, an optical disk, a storage device, and/or as a remote server and/or computing cloud (e.g., accessed using a network connection).

Storage device 202 stores one or more target files 202B that are protected from being overwritten by malicious code, as described herein. Storage device 202 is optionally implemented as persistent (i.e., non-volatile) storage, for example, a hard disk, and/or flash memory. Storage device 202 may be implemented as, for example, temporary storage, permanent storage, high-speed memory, low-speed memory, a memory device integrated with the computer, an external storage unit (e.g., accessed by a cable, over a wireless link, and/or over a network connection), a primary storage, a main memory, semiconductor memory, a hard-drive, an optical drive, a random access memory, volatile memory, non-volatile memory, a central processing unit (CPU) memory, a cache, a solid-state drive, built-in memory, removable memory, and/or other data storage hardware implementations.

A safe memory location 212 is designated for redirecting the overwrite operation from the target file 202B stored in storage device 202 to safe memory location 212, optionally for overwriting a mirror file 212B of target file 202B, as described herein. Safe memory location 212 may be a partitioned and/or designated region of a main memory, a designated memory, a designated storage device, and/or of storage device 202.

Optionally, the code (e.g., malicious code) attempting to perform the overwrite operation on file 202B stored in storage device 202 is separated from mirror file 212B stored in safe memory location 212. The separation is designed to limit and safely control the behavior of the code performing the overwrite operation, to prevent undesired malicious activity. Safe memory location 212 may be implemented, for example, using a sandbox or other applications designed to control execution of malicious programs. In another implementation, safe memory location may 212 may be executed in kernel space, and the code of the process attempting to overwrite file 202B stored in storage device 202 may be executed in user mode. In another implementation, a hypervisor/VMM (Virtual Machine Monitor) may be used to store the mirror file in a separate virtual machine to achieve greater separation.

Computing unit 204 may include a network interface 214 for connecting to a network 216, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing unit 204 may access one or more remote servers 218 using network 216, for example, to download updates to whitelist 210B, to report and/or identified malicious code that attempted to overwrite a file.

Storage device 202 and/or safe memory 212 may be implemented, for example, within program store 208, within data repository 210, by an external (e.g., permanent or removable) storage unit 220, and/or by server 218 acting as a remote storage device (e.g., located as a network node and/or within a computing cloud).

Computing unit 204 includes or is in communication with a user interface 222 allowing a user to enter data and/or view presented data. Exemplary user interfaces 222 include, for example one or more of, a touchscreen, a display, a keyboard, a mouse, and voice activated software using speakers and microphone.

One or more of the acts of the method described with reference to FIG. 1 may be stored as code instructions (e.g., by program store 208) and executed by one or more processors (e.g., processing unit 206 of computing unit 204).

At 102, file(s) 202B stored in storage device 202 are monitored to detect a request to access at least a portion of at least one file. Optionally the request includes an overwrite operation to at least the portion of file(s) 202B. The overwrite operation may be detected based on a write operation to a non-empty location in the original file(s) 202B and/or an operation to change the non-empty location in the original file(s) 202B.

As used herein, the term target file means the file that is the target of the request to perform the overwrite operation.

The monitoring may be performed, for example, by a file system driver which may be a kernel-mode component of an operating system, and/or other code instructions designed to monitor request to the operating system (or other low-level system) to access a file to perform an overwrite operation.

As used herein, the term overwrite may mean destroying the contents of the target file. Simple recover tools cannot be used to restore the overwritten file. Exemplary operations that may be included in the term overwrite include one or more of: encrypting at least the portion of the file, changing content of at least the portion of the file (e.g., by writing irrelevant values over the data of the file, for example, the number zero), and deleting the portion of the file (e.g., a permanent delete that is difficult or cannot be recovered).

Optionally, at 104, the code instructions executed by one or more processors determine whether the target file is designated for protection. Optionally, each target file associated with a request to perform an overwrite operation on the target file may be designated for protection. Alternatively, an analysis is performed to determine when the target file is designated for protection, and when the overwrite operation is allowed to proceed without protecting the file. The analysis may be designed based on a tradeoff, by using the available computational and/or memory resources to protect target files that are at highest risk of being destroyed by the malicious code, and/or files that would cause a high loss (e.g., financial loss) when destroyed by the malicious code.

Optionally, the designation of the file(s) for protection may be performed in advance, before the request to overwrite the file is detected, for example, by the user manually defining the files and/or code automatically designating the files based on a predefined set-of-rules. Alternatively or additionally, the designation of the file for protection may be performed dynamically, in response to the detection of the request to overwrite the file. Each target file may be analyzed in real-time to determine whether the overwrite operation is allowed to proceed or whether the file undergoes the protection process.

Optionally, the designation of files for protection is manually performed by a user, for example, using a user interface (e.g., graphical user interface (GUI)) to manually select (e.g., click) files to protect. In another example, the user may use the GUI to enter a set-of-rules defining which files are to be protected, for example, all files within a certain folder, all files having a certain filename, file-type or extension (e.g., ending in .doc), and/or all files of a certain type which may including a family of file extensions (e.g., Microsoft Word® files).

Alternatively, the designation of the file(s) is automatically performed, optionally based on a predefined set-of-rules (e.g., stored in a set-of-rules repository in data repository 210).

The designation of the file(s) may be automatically performed according to an analysis of a format of the file according to a predefined file format designated for protection (e.g., defined by the set-of-rules). The file structure and/or file format may be analyzed to determine whether the file structure and/or format corresponds to the structure and/or format designated for protection. The file formats may be defined based on files that store sensitive and/or valuable data, for example, financial records, medical records, personal records, corporate work assignments, product definitions, and/or other data which may be difficult, impossible, and/or financially expensive to reproduce if destroyed. Exemplary file formats include: a word processing document file format, a spreadsheet file format, a PDF file format, a movie format, and a customized file format (e.g., used by a customized business critical) and a presentation file format.

Alternatively or additionally, the file is designated for protection based on an analysis of the request. The file may be designated for protection when the request includes an operation to overwrite to a header of the file. Overwriting the header of the file may be associated with malicious code.

Alternatively or additionally, the file is designated for protection based on an analysis of the requesting code instructions. When the request to overwrite the target file is associated with an application without a visible window presented on a display, the target file may be automatically designated for protection. Applications running in the background without an association to an interface with a user (e.g., GUI) may be associated with malicious code.

Alternatively or additionally, when the request to overwrite the target file is detected, a user interface (e.g., GUI) may be presented on a display (e.g., user interface 222) with an input option (e.g., selection icon) for the user to confirm the overwrite request as safe (and approve the overwrite operation), and/or to prevent the overwrite operation from proceeding. The GUI may be presented each time an overwrite request is identified as being associated with malicious code, and/or for certain overwrite request at high risk of being associated with malicious code (e.g., according to the set-of-rules), for example, overwrite request to the designated file formats which invalidates the file format. When the user identifies the overwrite request as originating from a safe application, the user defined application may be added to a whitelist of safe applications that are allowed to overwrite files. The whitelist may store applications that are safe but that exhibit cryptoware-like behavior, for example, file encryption programs (e.g., to enhance security of files), and file compression programs. The whitelist may be stored, for example, in a whitelist repository stored in data repository 210.

In some implementations, block 104 may be executed before block 102, for example, to define which files are designated for protection, and to perform the monitoring of the protected files.

Optionally, at 106, records in one or more stack traces of the code instructions associated with the request to perform an overwrite protection on the target file are analyzed to determine an association with malicious code. The records may include flow-data including the stack trace(s) and one or more of: thread data, module data, and process data related to the code instructions associated with the overwrite operation request. The analysis using the stack trace and/or flow-data to determine association with malicious code may be triggered when a file is opened by a user. Detection of malicious code associated with the file being opened may trigger blocking of the file from being opened. The overwrite protection mechanism (described herein) is activated even if the stack based algorithm failed to detect the association with malicious activity. The computing device hosting the file is protected even when the user tries to open the malicious code affected file (which the user may open thinking the file is legitimate).

Additional details of analysis the stack trace and/or flow-data to determine association with malicious code is described with reference to U.S. patent application Ser. No. 14/949,913 (herein referred to as "'913") titled "SYSTEMS AND METHODS FOR MALICIOUS CODE DETECTION" assigned to the same Assignee, and by at least one of the same inventors, in corporate herein by reference in its entirety. The method described with reference to '913 may be adapted to identify malicious code that overwrites data (e.g., encrypts and/or destroys files) in response to opening of a file with write permission. For example, the connection establishment (as described with reference to '913) may be adapted to opening a file with write permission (as described herein). The method described with reference to '913 may be adapted by treating an attempt to access and/or overwrite a file as a connection establishment attempt. If a file is opened with write permissions or being overwritten an analysis similar to connection establishment analysis is done to determine to the file access should be allowed. If it is not access to the file is denied. The analysis is done only once.

When the malicious code is identified, block 116 may be executed, for example, to block the overwrite operation and/or to isolate and/or remove the malicious code. Alternatively or additionally, when the malicious code is identified, or a probably of malicious code is identified (e.g., with a probability that the malicious code is safe code) the target file may be protected (as described herein) and the overwrite operation may be redirected to safe memory 212 as described herein.

Alternatively or additionally, the code instructions associated with the request to perform the overwrite operation is assumed to be associated with malicious code (and therefore redirected to perform the overwrite operation at safe memory 212 and described with reference to block 110) when the code instructions are not identified within the whitelist of safe applications exhibiting cryptoware-like behavior.

At 108, a mirror file 212B of file(s) 202B designated for protection is created at safe memory location 212. File 212B may be a mirror of the entire content of file 202, or portions thereof (e.g., file header, initial portion of the file, sensitive data of the file).

Optionally, mirror file 212B includes the portion(s) of file(s) 202B that are designated to be overwritten by the overwrite operation. Optionally mirror file 212B does not include the portion(s) of file(s) 202B that are unaffected by the overwrite operation. Storing the portion(s) of file(s) 202B designated to be overwritten and/or not storing the portion(s) of file(s) 202B that are unaffected by the overwrite operation reduces the storage capacity for storing mirror file 212B, for example, mirror file 212B may be storage with significantly smaller storage space than file 202B when the overwrite operation affects a small region of file 202B.

It is noted that mirror file 212B represents the updated version of file 202B, representing the state of file 202B when operations are permitted to proceed. Operations affecting file 202B are transferred (e.g., redirected, mapped) to mirror file 212B. For example, a certain process attempting to read file 202B (which may be unrelated to the potentially malicious code attempting to overwrite file 202B) is directed to read from mirror file 212B, which includes the most updated and consistent version of file 202B.

The creation of the mirror file(s) may be performed in real-time, triggered in response to identification of the request to overwrite the target file(s) (e.g., as described with reference to block 102). The same or similar block of safe memory 212 may be re-used to create different mirror file(s), for example, upon detection of new requests to overwrite different target files. The size of safe memory 212 may be relatively small, for example, selected to include one or several files, or portions of files. The creation of the mirror file(s) may be performed in advance, upon designation of the file(s) for protection (e.g., as described with reference to block 104). It is noted that in some implementations, block 108 may be executed before blocks 102 and/or 104.

Alternatively, no mirror file 212B is created. Safe memory 212 may be used without necessarily creating mirror file 212B.

At 110, the overwrite operation is redirected to safe memory 212, optionally to overwrite mirror file 212B. The redirection of the overwrite operation protects target file 202B at storage device 202 from being overwritten by the overwrite operation. File 202B remains intact during the overwrite operation performed at safe memory 212. For example, when an application is associated with an identified operation to overwrite target file 202B at offset 50 using values stored in a buffer of length 20 bytes, the redirection is performed by copying the contents of the buffer to offset 50 of mirror file 212B (i.e., rather than overwriting target file 202B). Alternatively or additionally, the file changes may be stored in a data structure (e.g., red-black range tree) designed for quickly finding and managing the modification to the file. The storage of the file itself may be managed, for example, similar to a Copy-On-Write mechanism used to share memory. For example, the file maybe split to page (4 kilobyte) size portions in memory and the page is copied when a write to the respective portion of the file is detected.

Optionally, the mirror file is created by iteratively copying for successive portions of the file. The write operation to the respective successive portion triggers the copying to the location of the mirror file, for example, similar to the Copy-On-Write mechanism. Each successive portion may be copied to the corresponding location of the mirror file according to a predefined size threshold.

The redirection may be performed by modifying the parameters of the write operation to mirror file 212B (or another location in safe memory 212) rather than target file 202B stored in storage device 202.

At 112, the data stored during the redirected overwrite operation at safe memory 212 (optionally at mirror file 212B) is analyzed. The effects of the overwrite operation on contents of safe memory 212 (optionally on content of mirror file 212B) may be analyzed. The analysis is performed to determine whether the overwrite operation is associated with malicious code or whether the overwrite operation is associated with safe code.

The analysis of the overwrite operation may be performed after a delay and/or trigger event, for example, after a certain time threshold has passed (e.g., long enough to allow processes accessing the file being overwritten to complete execution), and/or when the opened file is closed.

Optionally, the analysis of the effects of the overwrite operation on the contents mirror file 212B is triggered when the process attempting to perform the overwrite operation closes the file (e.g., closes the file handle). Alternatively or additionally, the analysis of the effects of the overwrite operation on the contents mirror file 212B is triggered when a certain size (e.g., predefined storage capacity) of the mirror file 212B is reached. The predefined storage capacity may be determined, for example, based on the storage capacity of safe memory 212 storing mirror file 212B, and/or according to desired processing speed (i.e., multiple smaller chunks may be analyzed quicker than one larger chunk).

The analysis may include an analysis of the data written into safe memory 212 (e.g., over mirror file 212B), which may include the non-overwritten portions of safe memory 212. For example, mirror file 212B may be partially overwritten, for example, a field may be changed as part of the overwrite process. The newly written contents of the field may be analyzed, and/or the entire content of the file including the field may be analyzed.

The analysis may include checking whether the file was read by the process executing the overwrite instructions before the file was overwritten by the overwrite instructions. Checking whether the file was read first, before being overwritten may reduce the probability of false positive identification (i.e., reduce the chance of incorrectly identifying malicious code when the code is actually safe authorized code) based on the assumption that the malicious code first reads the file before encrypting the file, to be able to recover the encrypted file (e.g., once the user pays the random).

The analysis of the overwrite operation may be analyzed dynamically during the overwrite operation, for example, when a predefined size of data has been stored as part of the overwrite operation (e.g., a predefined size of mirror 212B has been overwritten). Using a threshold defined by the predefined size of data helps prevent the size of mirror file 212B from consuming a large portion of memory 212. The analysis may be performed on chunks of file 202B, by iteratively creating mirror file 212B for each chunk being analyzed. Sequential created mirror files 212B based on chunks of file 202B may be overwritten to the same (or similar or neighboring) location of safe memory 212. Chunks that are determined as associated with safe code may be permitted to commit to storage 202. Chunks that are determined as associated with malicious code may be processed using one of the following optional features: be prevented from committing to storage 202, presenting a GUI asking the user permission to commit to storage 202 or whether the chunk is affected by malicious code, and/or removal of mirror file 212B. Alternatively or additionally, the analysis of the overwrite process may be analyzed upon completion of the overwrite operation.

The analysis may be performed by checking whether the process executing the overwrite operation on the file performs additional overwrite operations on one or more other files. The association with malicious code may be identified when the process executing the overwrite operation performed additional overwrite operations on a predefined number of files, for example, at least 2, 5, 10, or other number of files. Identification of the association with malicious code based on the overwrite operation performed on the predefined number of files may reduce the probability of false positive identification based on the assumption that malicious code attempts to overwrite (e.g., encrypt) multiple files as part of an attack.

The analysis may be performed by detection of an attempt to delete (e.g., deletion operation) the portion(s) of the file(s) after the overwrite operation of the portion(s) of the file. The delete operation may be instructed by the process that instructs the overwrite operation. The identification of the malicious code is based on an observation that the malicious code may attempt to delete file(s) after the malicious code overwrites the file(s) (e.g., encrypts the file(s)). It is noted that the actual file 202B is not erased and/or affected by the overwrite operation and/or the delete operation.

The analysis may be performed by detecting an attempt to (or execution of the instructions that) rename the file(s) and/or change the extension of the file(s). The renaming and/or changing of the extension of the file(s) may be performed as part of the overwrite operation, for example, prior to the overwrite operation, in parallel with at least some of the overwrite operation, and/or after the overwrite operation. The identification of the malicious code may be based on the observation of the attempt to (or execution of) rename and/or change the extension of the file(s).

Optionally, the analysis is performed by verifying the file structure of mirror file 212B according to a predefined file structure (which may be defined by target file 202B). Mirror file 212B may be parsed to identify fields defined by the file format. The integrity of the data stored in each field may be validated based on the allowable values that may be stored in the respective field (e.g., defined by the predefined file structure format, by user defined set-of-rules, or other predefined rules). For example, a field that stores a file creation date of target file 202B must not store a future date. The presence of a future date in the file creation field of mirror file 212B after the overwrite operation suggests an association with malicious code.

In another example, to determine when mirror file 212B is encrypted or otherwise destroyed by the overwrite operation associated with malicious code, the file format of mirror file 212B is determined to be based on the Target Image File Format (TIFF) (e.g., based on the TIFF of target file 202B). The content of mirror file 212B is analyzed to determine whether the header of mirror file 212B follows the Image file Header (IFB) defined by TIFF:

```
typedef struct_TiffHeader
{
    WORD Identifier; /* Byte-order Identifier */
    WORD Version;    /* TIFF version number (always 2Ah) */
    DWORD IFDOffset; /* Offset of the first Image File Directory*/
} TIFHEAD;
```

The Identifier field must contain only one of two possible values, II or MM. The Version field must be set to 2A. The field IFDOffset stores the offset to the start of another structure, and therefore the value stored in the IFDOffset field must be smaller than the size of mirror file 212B.

Alternatively or additionally, the analysis is performed by identifying that the data of mirror file 212B is encrypted by the overwrite operation. The encryption of mirror file 212B may be detected by calculating the entropy of mirror file 212B, for example, using Shannon's method. The calculated entropy value may be evaluated using a requirement (e.g., function, threshold, range) defining an association with encryption (e.g., probability of being encrypted, or a determination of encryption or non-encryption). Fields may be identified in mirror file 212B (e.g., by parsing mirror file 212B, and/or by the definition of the file type of mirror file 212B), and the entropy calculated for each field. Each field may be evaluated for encrypted contents using a respective requirement, which may be different and/or unique for the field. For example, fields storing user created text may require a relatively lower level of calculated entropy to determine encryption, since text in such fields manually created by users is expected to be highly organized and less random. Fields used to store automatically created data may require a relatively higher level of calculated entropy to determine encryption, since data in such fields may be less organized and more random. Alternatively or additionally, the entropy value is calculated for the entire file, and/or for one or more portions of the file, and evaluated using the requirement.

Alternatively or additionally, the analysis is performed by identifying that the data of mirror file 212B includes one or more illegal values. The illegal values may be an indication of encryption of the mirror file, for example, encryption of at least the data of the original file corresponding to the illegal value(s). The mirror file may be parsed to identify one or more fields storing one or more values. The illegal value(s) may be determined by comparing value(s) of each identified field of the mirror file to the corresponding value(s) of the field(s) of the file at the storage device location. The compared difference may be evaluated according to a requirement representing predefined allowed values. For example, in the above example the field Identifier must contain only one of two possible values. Optionally the original file may be used to reduce false-positives by checking if it also contained illegal value, if it did the modification is assumed to be valid.

Encryption may be detected by calculating the entropy for mirror file 212B and corresponding data of target file 202B, optionally the entropy value is calculated for one or more corresponding fields. The difference between the calculated entropy values (e.g., per field, per portion of the file, and/or for the entire file) may be evaluated using another requirement representing an allowed tolerance error between the calculated entropy values. A significant different between the calculated entropy of target file 202B and mirror file 212B represents encryption of mirror file 212B.

Alternatively or additionally, the analysis is performed based on text heuristics. The text heuristic analysis may be performed for one or more predefined fields of mirror file 212B. The file format associated with mirror file 212B may define the field as text fields, and/or allowed to include text, for example, ASCII values and/or UNICODE encoding types. Alternatively or additionally, the text fields (or regions of mirror file 212B) may be identified by an analysis of target file 202B to determine portion and/or fields that contain only text or mostly text. When non-text values are identified in the text fields and/or regions of mirror file 212B that are expected to include text, the non-text values are considered as being encrypted values and/or destroyed data due to the overwrite operation. It is noted that the text heuristic analysis may be changed and/or disabled, for example, when files are stored based on a non-text format. To analyze unknown and/or hard-to-analyze file formats, a deep learning neural network may be used to identify the type of the file and/or verify that the file type is valid after the overwrite operation. The analysis may be performed by training the neural network on a large corpus of files associated with a given file type label.

The analysis may be performed for certain parts of mirror file 212B, which may represent critical parts of the file, and/or file portions (e.g. fields) that are most commonly affected. When the fields are not identified as being encrypted, destroyed, or otherwise affected by malicious code, the remaining portions of the file may be assumed to also be unaffected by the malicious code. For example, when the file header of mirror file 212B is identified as remaining intact after the overwrite operation, the remaining portion of the file may be assumed to be unaffected by malicious code.

Alternatively or additionally, when a read operation to the protected target file(s) 202B is detected (e.g., by the file driver), the analysis may be performed on mirror file 212B to detect whether the requested data was overwritten. The read operation may be used to direct the analysis to the portion(s) of mirror file 212B to be analyzed, for example, based on the assumption that the read is performed by malicious code to verify a successful overwrite. The data returned to the read operation may be the original unmodified data obtained from the corresponding location of target file 202B. Alternatively, the data returned to the read operation may be the overwritten data obtained from mirror file 212B. The malicious code may be identified and removed by anti-malware code. In another example, the requesting process receiving back original unmodified data may attempt another overwrite request, which may identify the code as malicious code.

At 114, when the analysis identifies the overwrite operation as being associated with malicious code, mirror file 212B (and/or the overwritten locations of safe memory 212 when no mirror file is created) is deleted, optionally permanently. Alternatively, mirror file 211B is preserved, for example, forwarded to a remote server for analysis to help determine the malicious code.

It is noted that target file 202B does not need to be restored, because the overwritten operation is directed to mirror file 212B rather than allowed to operate on target file 202B.

At 116, an indication of the attempt to overwrite the target file by malicious code is outputted, for example, a warning message is presented to the user on a display (e.g., user interface 222), an anti-malware application may be automatically triggered to try and locate and/or isolate the malicious code, and/or a report may be transmitted to a server with details of the overwrite attempt (e.g., to a network administrator, to a research center to help design an update to anti-malware applications).

Optionally, the indication triggers a blocking of the overwrite operation.

Optionally, when the indication of the attempt to overwrite the target file by malicious code is identified, the GUI may be presented on the display (e.g., user interface 222) with an option (e.g., selection icon) for the user to confirm the overwrite request as malicious code and prevent the overwrite operation from proceeding, and/or define the overwrite request as safe (i.e., known safe code that is not malicious) and permit the overwrite operation to proceed.

Alternatively, at 118, when the analysis fails to identify malicious behavior of the overwrite operation (e.g., lack of encryption and/or lack of destruction of data), the overwrite operation is assumed to be associated with safe code.

At 120, the modified version of mirror file 212B (modified by the overwrite operation) is used to overwrite target file 202B, to achieve the intended overwriting effect of the overwrite operation associated with the safe code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant overwrite operations will be developed and the scope of the term overwrite operation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for protecting data stored in at least one file from being overwritten by malicious code, the computer implemented method comprising:
 monitoring, by a processing system, at least one file stored in a storage device location to detect a request to perform an overwrite operation at least a portion of data of the at least one file;
 redirecting, by the processing system, the overwrite operation to a memory location designated as safe for being overwritten;
 analyzing, by the processing system, the overwrite operation at the memory location to identify an association with malicious code;
 outputting, by the processing system, an indication of an attempt to overwrite the at least one file by malicious code;
 creating, by the processing system, a mirror of the at least one file at the memory location, and redirecting the overwrite operation to the mirror of the at least one file; and
 wherein the analyzing the overwrite operation comprises identifying an encryption of the mirror of the at least one file that includes parsing the mirror to identify at least one field that will be a subject of the analyzing.

2. The computer implemented method of claim 1, wherein the analyzing the overwrite operation comprises verifying the file structure of the mirror of the at least one file according to a predefined file structure.

3. The computer implemented method of claim 1, wherein the analyzing the overwrite operation further includes calculating, by the processing system, a difference between a calculated entropy of each identified at least one field of the mirror and a calculated entropy of a corresponding at least one field of the file at the storage device location, and evaluating the calculated difference according to a requirement representing an allowed tolerance error between the calculated entropy values.

4. The computer implemented method of claim 1, wherein the analyzing the overwrite operation further includes determining, by the processing system, at least one illegal value in the at least one field by comparing at least one value of each identified at least one field of the mirror to a corresponding at least one value of at least one field of the file at the storage device location, and evaluating the compared difference according to a requirement representing predefined allowed values.

5. The computer implemented method of claim 1, wherein the mirror of the at least one file stores only the portions of at least one file that are designated to be overwritten by the overwrite operation, wherein the mirror of the at least one file does not include portions of the at least one file that are unaffected by the overwrite operation.

6. The computer implemented method of claim 1, wherein the creating the mirror file is performed iteratively for successive portions of the at least one file, wherein each successive portion is copied to the location of the mirror file triggered by a write operation to the respective portion, wherein the analyzing is performed iteratively for each successive portion.

7. The computer implemented method of claim 1, wherein the analyzing the overwrite operation comprises checking whether the portion of data of the at least one file is read prior to the request to perform the overwrite operation of the portion of the at least one file.

8. The computer implemented method of claim 1, wherein the association with malicious code is identified when the overwrite operation is detected as being performed on a plurality of files including at least a predefined number of files or when a deletion operation of the portion of the at least one file is attempted after the overwrite operation of the portion of the at least one file.

9. The computer implemented method of claim 1, wherein the overwrite operation comprises at least one of: encrypting at least the portion of the at least one file, renaming the at least one file, changing content of at least the portion of the at least one file to irrelevant values, and deleting at least the portion of the at least one file.

10. The computer implemented method of claim 1, further comprising determining, by the processing system, whether the at least one file is designated for protection; wherein determining comprises analyzing a format of the at least one file according to a predefined file format designated for protection; wherein the predefined file format is a member selected from the group consisting of: a word processing document file format, a spreadsheet file format, a PDF file format, and a presentation file format.

11. The computer implemented method of claim 1, further comprising:
 analyzing, by the processing system, the overwrite operation to identify an overwrite to a header of the at least one file; and
 triggering, by the processing system, the redirecting the overwrite operation when the overwrite to the header is identified.

12. The computer implemented method of claim 1, further comprising:
 analyzing, by the processing system, the overwrite operation at the memory location to identify an association with safe code; and
 overwriting, by the processing system, the at least one file at the storage device location with the overwritten data at the memory location.

13. The computer implemented method of claim 1, further comprising deleting, by the processing system, the overwritten data at the memory location when the analysis identifies identify the overwrite operation associated with malicious code.

14. The computer implemented method of claim 1, wherein analyzing the overwrite operation is performed according to at least one of: when the overwrite operation is complete, and when a predefined size of data is overwritten.

15. The computer implemented method of claim 1, wherein analyzing the overwrite operation comprises detecting encryption by calculating entropy of the data overwritten at the memory location according to an entropy requirement representing encrypted data.

16. The computer implemented method of claim 1, further comprising presenting, by the processing system, a user interface on a display in response to detecting the overwrite operation to allow a user to confirm the overwrite operation as associated with safe code and adding an application associated with the overwrite operation to a whitelist of safe applications exhibiting cryptoware-like behavior when the user confirms the overwrite operation as safe.

17. The computer implemented method of claim 1, further comprising performing, by the processing system, the redirecting when an application associated with the overwrite operation is not identified within a whitelist of safe applications exhibiting cryptoware-like behavior.

18. The computer implemented method of claim 1, further comprising performing the analyzing in response to opening of the at least one file with write permission and/or file overwrite, wherein the analyzing the open/overwrite operation is performed by an analysis of at least one of stack trace and flow-data to determine whether access to the at least one file is permitted or whether access to the at least one file is denied.

19. A computer implemented method for protecting data stored in at least one file from being overwritten by malicious code, the computer implemented method comprising:
monitoring, by a processing system, at least one file stored in a storage device location to detect a request to perform an overwrite operation at least a portion of data of the at least one file;
redirecting, by the processing system, the overwrite operation to a memory location designated as safe for being overwritten;
analyzing, by the processing system, the overwrite operation at the memory location to identify an association with malicious code;
outputting, by the processing system, an indication of an attempt to overwrite the at least one file by malicious code;
creating, by the processing system, a mirror of the at least one file at the memory location, and redirecting the overwrite operation to the mirror of the at least one file; and
wherein the analyzing the overwrite operation comprises identifying, by the processing system, non-text data at least at one location of the mirror of the at least one file designated to include text data at the corresponding at least one location of the at least one file at the storage device location.

20. The computer implemented method of claim 19, wherein the analyzing the overwrite operation comprises verifying the file structure of the mirror of the at least one file according to a predefined file structure.

21. A system for protecting data stored in at least one file from being overwritten by malicious code, the system comprising:
a processing system;
a computer readable medium communicably coupled to the processing system and having stored therein non-transient instructions that when executed by the processing system cause the processing system to:
monitor at least one file stored in a storage device location to detect a request to perform an overwrite operation at least a portion of data of the at least one file;
redirect the overwrite operation to a memory location designated as safe for being overwritten;
analyze the overwrite operation at the memory location to identify an association with malicious code;
output an indication of an attempt to overwrite the at least one file by malicious code;
create a mirror of the at least one file at the memory location, and redirecting the overwrite operation to the mirror of the at least one file; and
wherein the analyzing the overwrite operation comprises identifying an encryption of the mirror of the at least one file that includes parsing the mirror to identify at least one field that will be a subject of the analyzing.

22. A computer readable medium, the computer readable medium comprising:
non-transient instructions that when executed by a processing system cause the processing system to:
monitor at least one file stored in a storage device location to detect a request to perform an overwrite operation at least a portion of data of the at least one file;
redirect the overwrite operation to a memory location designated as safe for being overwritten;
analyze the overwrite operation at the memory location to identify an association with malicious code;
output an indication of an attempt to overwrite the at least one file by malicious code;
create a mirror of the at least one file at the memory location, and redirecting the overwrite operation to the mirror of the at least one file; and
wherein the analyzing the overwrite operation comprises identifying an encryption of the mirror of the at least one file that includes parsing the mirror to identify at least one field that will be a subject of the analyzing.

\* \* \* \* \*